US007761351B2

(12) United States Patent
Gastineau et al.

(10) Patent No.: US 7,761,351 B2
(45) Date of Patent: Jul. 20, 2010

(54) METHOD AND SYSTEM FOR ASSESSING THE RISK OF A VEHICLE DEALERSHIP DEFAULTING ON A FINANCIAL OBLIGATION

(75) Inventors: Chas Gastineau, Beverly Hills, MI (US); David Hamley, Wexford, PA (US); Garth Waldron, Ypsilanti, MI (US); Idowu Olorunfemi, LaSalle (CA); Mario Spivak, Ann Arbor, MI (US); Robert Camp, Winston-Salem, NC (US); Tom Knoll, Highlands Ranch, CO (US); Todd Kolchinsky, Farmington Hills, MI (US); Winnie Lin, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 1429 days.

(21) Appl. No.: 10/834,664

(22) Filed: Apr. 29, 2004
(Under 37 CFR 1.47)

(65) Prior Publication Data
US 2005/0246256 A1 Nov. 3, 2005

(51) Int. Cl.
*G06Q 40/00* (2006.01)
(52) U.S. Cl. .......................... 705/35; 705/38; 705/36 R
(58) Field of Classification Search .................. None
See application file for complete search history.

(56) References Cited
U.S. PATENT DOCUMENTS 6,202,053 B1 3/2001 Christiansen et al.

| | | | |
|---|---|---|---|
| 2002/0161731 A1* | 10/2002 | Tayebnejad et al. | 706/20 |
| 2003/0009368 A1* | 1/2003 | Kitts | 705/10 |
| 2004/0122756 A1* | 6/2004 | Creeden et al. | 705/35 |
| 2004/0260582 A1* | 12/2004 | King et al. | 705/7 |
| 2006/0085325 A1* | 4/2006 | Jammal et al. | 705/38 |
| 2007/0043654 A1* | 2/2007 | Libman | 705/38 |

OTHER PUBLICATIONS

Francis Edum-Fotwe, "A review of financial ratio tools for predicting contractor insolvency", Dec. 1995, pp. 190-198.*
SEC Info—Volkswagen Dealer Finance LLC, Aug. 2000, pp. 1-4.*
Barclays Capital Research, Dealer Floorplan (Wholesale) ABS, Jan. 2003, pp. 1-5.*
Lithia Motors Inc—LAD Annual Report (10-K) Liquidity and Capital Resources, Mar. 2001, pp. 1-3.*
"Moody' S RickCalc" Research Data Products (1 pg.), Jul. 9, 2002.
"KMV" Credit Monitor (4 pgs.), 1997-2002.

* cited by examiner

*Primary Examiner*—Alexander Kalinowski
*Assistant Examiner*—Gregory Johnson
(74) *Attorney, Agent, or Firm*—Raymond Coppiellie; Brooks Kushman P.C.

(57) ABSTRACT

The present invention relates to a method and system of assessing the risk of a vehicle dealership defaulting on a financial obligation. A preferred method embodiment of the present invention includes receiving at least one financial factor with a plurality of point weights and vehicle dealership financial statement information and determining a dealership point weight for each financial factor based on the plurality of point weights and the financial statement data to obtain a default risk rating based on the dealership point weight(s).

17 Claims, 1 Drawing Sheet

METHOD AND SYSTEM FOR ASSESSING THE RISK OF A VEHICLE DEALERSHIP DEFAULTING ON A FINANCIAL OBLIGATION

BACKGROUND OF THE INVENTION

1. Field of the Invention

This invention relates generally to assessing vehicle dealership default risk and, more specifically, to a method for assessing the risk of a vehicle dealership defaulting on a financial obligation.

2. Background Art

In the automotive industry, the ability to accurately forecast a vehicle dealership's risk of defaulting on a contractual obligation to a vehicle manufacturer is critical. Default occurs when the dealership cannot meet their contractual obligations to the vehicle manufacturer.

Many risk models exist that are capable of assessing default risk across all industries. For example, the RiskCalc model, available from Moody's Investor Services of New York City, N.Y., predicts default risk for private companies. Company Watch, Inc. of London, England, offers a risk rating model based on publicly available information for British companies. KMV Inc. of San Francisco, Calif., offers a risk assessment model for public companies based on stock price volatility. These models do not adequately predict the risk associated with privately held vehicle dealerships due to the lack of comparability between dealership financial data and that of companies of similar size in other industries.

One known method for assessing default risk of vehicle dealerships segments the dealerships into four risk categories. The method uses the following factors: years in business, trade and bank reference, wholesale audit performance, months since last returned check or deft, used floor plan and capital loans and working capital, tangible base capital (TBC), annualized profit percentage, and debt to TBC ratio. Based on these factors, a dealership can be ranked in category A, B, C, or D, with A being the lowest risk and D being the highest risk. In certain situations, the factors considered do not accurately segment vehicle dealerships based on their risk characteristics.

There exists a need for a method and system of assessing vehicle dealer default risk accurately by concentrating on the automotive industry and vehicle dealership financial statement data. Additionally, there is a need for a method and system of assessing default risk that segments vehicle dealerships based on their default risk characteristics.

SUMMARY OF THE INVENTION

The present invention relates to a method and system for assessing the risk of a vehicle dealership defaulting on a financial obligation.

A preferred method embodiment of the present invention includes receiving at least one financial factor with a plurality of point weights and vehicle dealership financial statement information and determining a dealership point weight for each financial factor based on the plurality of point weights and the financial statement data to obtain a default risk rating based on the dealership point weight(s).

The preferred method embodiment may additionally include receiving at least one financial ratio. The financial ratio(s) may include current ratio, net cash per average monthly expense, used vehicle equity, break-even analysis, modified quick ratio, sales trend, percent vehicle inventory sold out of trust (SOT), current ratio trend, accounts payable and accruals per average monthly expense, EBIT per tangible base capital (TBC), and/or operating cash flow coverage.

A preferred system embodiment of the present invention includes receiving at least one financial factor with a plurality of point weights and vehicle dealership financial statement information and determining a dealership point weight for each financial factor based on the plurality of point weights and the financial statement data to obtain a default risk rating based on the dealership point weight(s).

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENT(S)

Figure 1:
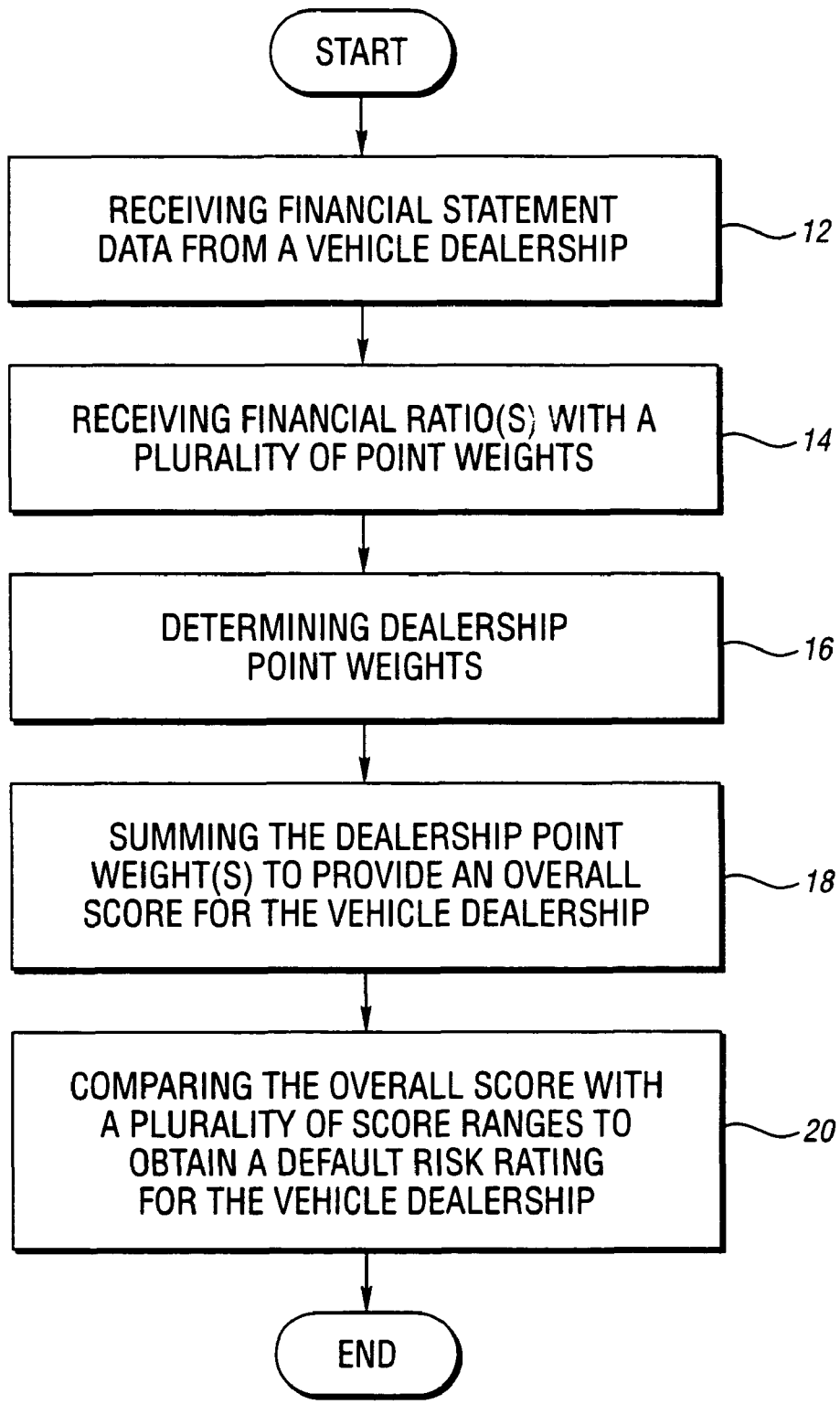
FIG. 1 is a block flow diagram illustrating a preferred methodology for implementing the present invention.

The present invention includes a preferred method for developing a method for assessing the default risk of a vehicle dealership and a preferred method and system for implementing the method for assessing the vehicle dealership default risk.

Preferably, development of the default risk assessment method includes transforming a set of available financial ratios, determining a plurality of financial ratios for inclusion in the preferred method for assessing vehicle dealership default risk, calculating point weights for the plurality of financial ratios, and summing the point weights to provide a dealership score.

Based on automobile industry standards and input from financial experts, 77 available financial ratios were identified for the transformation step. For each ratio, the transformed value is defined as the fraction of non-status dealers per decile in a group of dealers. According to the present invention, the financial statement data of 2565 non-status (i.e., dealerships that paid as agreed) and 123 status dealerships (i.e., dealerships that defaulted on a contractual obligation) were used as a sample for calculating transformed values. It should be understood that a decile is one of nine numbers that divide the distribution of ratio values into ten classes such that each class includes the same number of dealers. Preferably, the deciles are grouped to ensure monotonicity and scaled to minimize mean and unit variance.

Table 1 lists the transformed values for the current ratio. It should be understood that the current ratio is computed by the following equation:

$$\text{total current assets/total current liabilities} \qquad (1)$$

The transformed values relate to a range of current ratios that are defined by the minimum and maximum values in the range. If the denominator or numerator is missing from the current ratio calculation, the transformed value is set to 0. If the denominator is less than or equal to 0, the transformed value is set to 1.608.

TABLE 1

| Minimum Value | Maximum Value | Transformed Value |
|---|---|---|
| denominator missing | | 0.000 |
| denominator <= 0 | | 1.608 |
| 1.9771 | >1.9771 | 1.286 |
| 1.6395 | 1.9694 | 0.920 |
| 1.4911 | 1.6384 | 0.920 |
| 1.3924 | 1.4899 | 0.920 |
| 1.3241 | 1.3941 | 0.170 |
| 1.2701 | 1.3241 | 0.012 |
| 1.2179 | 1.2697 | −0.587 |
| 1.1698 | 1.2176 | −0.591 |
| 1.1097 | 1.1694 | −1.061 |
| 0.2651 | 1.1097 | −2.001 |

Stepwise logistic regression of a non-status/status binary indicator, where ratios are evaluated for model inclusion one at a time, is preferably used to identify a plurality of financial ratios for inclusion in the preferred assessment method. Stepwise regression identifies those financial ratios that significantly contribute to the method of assessing default risk. Eleven financial ratios are preferred since adding more financial ratios does not significantly enhance the determination of the default risk of a vehicle dealership. The addition of more financial ratios can create redundancies since many financial ratios are similarly defined. However, it should be understood that more or less financial ratios can be used based on other considerations, such as access to dealership financial data necessary to compute the financial ratio value or changes in the business environment.

The preferred eleven financial ratios include current ratio, net cash per average monthly expense, used vehicle equity, break even analysis, modified quick ratio, sales trend, percent vehicle inventory sold out of trust (SOT), current ratio trend, accounts payable and accruals per average monthly expense, EBIT per tangible base capital (TBC), and operating cash flow coverage.

Table 2 provides the stepwise regression coefficient estimates for the 11 preferred transformed financial ratios. Stepwise regression coefficients refer to the marginal contribution of the transformed ratios to the linear model of default risk.

TABLE 2

| Financial Ratio | Estimate |
|---|---|
| current ratio | 0.2716 |
| net cash per average monthly expense | 0.5862 |
| used vehicle equity | 0.4083 |
| break even analysis | −0.1245 |
| modified quick ratio | 0.2281 |
| sales trend | 0.3646 |
| percent SOT | −0.1681 |
| current ratio trend | 0.1859 |
| accounts payable and accruals per average monthly expense | −0.2636 |
| EBIT per TBC | 0.2455 |
| operating cash flow coverage | 0.2352 |

The point weights for the plurality of financial ratios are calculated by the multiplicative product of three components: the transformed ratio value, the estimated logistic regression coefficient, and a scaling factor of 20/ln(2) or 28.85. The scaling factor ensures that an increase of 20 points in the overall score for a dealership doubles the non-status to status odds. The worst point weights for a given ratio are generally awarded if a value for computing the ratio is missing. Table 3 provides the point weights for the current ratio.

TABLE 3

| Minimum Value | Maximum Value | Transformed Ratio | Point Weight |
|---|---|---|---|
| total current liabilities missing | | 0 | −16 |
| total current liabilities <= 0 | | 1.608 | −16 |
| 1.9771 | >1.9771 | 1.286 | 10 |
| 1.6395 | 1.9694 | 0.920 | 7 |
| 1.4911 | 1.6384 | 0.920 | 7 |
| 1.3924 | 1.4899 | 0.920 | 7 |
| 1.3241 | 1.3941 | 0.170 | 1 |
| 1.2701 | 1.3241 | 0.012 | 0 |
| 1.2179 | 1.2697 | −0.587 | −5 |
| 1.1698 | 1.2176 | −0.591 | −5 |
| 1.1097 | 1.1694 | −1.061 | −8 |
| 0.2651 | 1.1097 | −2.001 | −16 |

The net cash per average monthly expense is computed according to equation 2.

$$\text{net cash/monthly total expense} \quad (2)$$

The net cash per average monthly expense is converted into point weights based on Table 4.

TABLE 4

| Minimum Value | Maximum Value | Point Weight |
|---|---|---|
| monthly total expense missing | | −29 |
| monthly total expense <= 0 | | −29 |
| 10.92 | >10.92 | 31 |
| 5.64 | 10.91 | 21 |
| 3.51 | 5.63 | 9 |
| 1.52 | 3.5 | 3 |
| 1 | 1.51 | 0 |
| 0.57 | 0.99 | 0 |
| 0.08 | 0.56 | −14 |
| −0.64 | 0.07 | −19 |
| <−0.65 | −0.65 | −29 |

The used vehicle equity is computed according to equation 3.

$$\text{(used vehicle inventory−used vehicle notes payable)/used vehicle inventory} \quad (3)$$

The used vehicle equity value is converted into point weights based on Table 5.

TABLE 5

| Minimum Value | Maximum Value | Point Weight |
|---|---|---|
| used vehicle inventory <= 0 | | −14 |
| 1 | >1 | 11 |
| 0.76 | 0.99 | 5 |
| <0.75 | 0.75 | −14 |

The break even analysis ratio is computed according to equation 4.

$$\text{(total fixed expense+(total liabilities−total current liabilities−notes payable for officers and owners)/5)/(total gross total dealership−total variable sales expense)} \quad (4)$$

The break even analysis value is converted into point weights based on Table 6.

TABLE 6

| Minimum Value | Maximum Value | Point Weight |
|---|---|---|
| denominator missing | | −7 |
| denominator <= 0 | | −7 |
| 0.58 | >0.58 | −7 |
| 0.53 | 0.57 | −1 |
| 0.49 | 0.52 | 0 |
| <0.48 | 0.48 | 2 |

The modified quick ratio is computed according to equation 5.

$$\text{(total current assets−inventory)/(total current liabilities−notes payable)} \quad (5)$$

The quick ratio is converted into point weights based on Table 7.

TABLE 7

| Minimum Value | Maximum Value | Point Weight |
|---|---|---|
| denominator missing | | −17 |
| denominator <= 0 | | −17 |
| 10.14 | >10.14 | 10 |
| 4.44 | 10.13 | 5 |
| 2.8 | 4.43 | 3 |
| 1.42 | 2.79 | −2 |
| 0.97 | 1.41 | −4 |
| <0.96 | 0.96 | −12 |

The sales trend is computed according to equation 6.

$$\text{(current year sales−previous year sales)/absolute value of previous year sales} \quad (6)$$

The sales trend value is converted into point weights based on Table 8.

TABLE 8

| Minimum Value | Maximum Value | Point Weight |
|---|---|---|
| missing | | 0 |
| 4.02 | >4.02 | 16 |
| 0.111 | 4.01 | 9 |
| 0.008 | 0.11 | 2 |
| −0.09 | 0.007 | −6 |
| <−0.1 | −0.1 | −17 |

The percentage SOT is computed according to equation 7.

$$\text{new vehicle notes payable/new vehicle inventory} \quad (7)$$

The percentage SOT value is converted to point weights based on Table 9.

TABLE 9

| Minimum Value | Maximum Value | Point Weight |
|---|---|---|
| denominator is missing | | 0 |
| denominator <= 0 | | −8 |
| 1.205 | >1.205 | −8 |
| 1.142 | 1.204 | −7 |
| 1.105 | 1.141 | −3 |
| 1.049 | 1.104 | 0 |
| 1.026 | 1.048 | 1 |

TABLE 9-continued

| Minimum Value | Maximum Value | Point Weight |
|---|---|---|
| 0.931 | 1.025 | 3 |
| <0.93 | 0.93 | 10 |

The current ratio trend is computed according to the equation 8.

$$\text{(current year current ratio−previous year current ratio)/absolute value of previous current ratio} \quad (8)$$

The current ratio trend is converted into point weights based on Table 10.

TABLE 10

| Minimum Value | Maximum Value | Point Weight |
|---|---|---|
| missing | | 0 |
| denominator is missing | | 0 |
| 0.008 | >0.008 | 6 |
| −0.074 | 0.007 | −2 |
| −0.134 | −0.075 | −3 |
| <−0.135 | −0.135 | −12 |

The accounts payable and accruals per average monthly expense is computed according to equation 9.

$$\text{(accounts payable+accounts accrued tax, payroll, bonus, profit sharing)/monthly total expense} \quad (9)$$

The accounts payable and accruals per average monthly expense is converted into point weights based on Table 11.

TABLE 11

| Minimum Value | Maximum Value | Point Weight |
|---|---|---|
| missing | | −16 |
| denominator is missing | | −16 |
| denominator <= 0 | | −16 |
| 3.42 | >3.42 | −16 |
| 1.87 | 3.41 | −7 |
| 0.9 | 1.86 | −1 |
| 0.75 | 0.89 | 0 |
| <0.74 | 0.74 | 10 |

The EBIT per TBC is computed according to equation 10.

$$\text{EBIT/TBC} \quad (10)$$

The EBIT per TBC is converted into point weights based on Table 12.

TABLE 12

| Minimum Value | Maximum Value | Point Weight |
|---|---|---|
| missing | | −13 |
| denominator is missing | | −13 |
| denominator <= 0 | | −19 |
| 0.06 | >0.06 | 3 |
| −0.05 | 0.05 | 0 |
| <−0.06 | −0.06 | −13 |

The operating cash flow coverage is computed according to equation 11.

$$\text{(operating profit+total depreciation−change in inventory−change in receivable+change in accounts payable and accrued)/(total current liabilities+ interest)} \quad (11)$$

The operating cash flow coverage is converted into point weights based on Table 13.

TABLE 13

| Minimum Value | Maximum Value | Point Weight |
|---|---|---|
| denominator <= 0 | | −9 |
| 0.017 | >0.017 | 5 |
| −0.041 | 0.016 | −1 |
| −0.179 | −0.042 | −2 |
| <−0.18 | −0.18 | −9 |

The point weights of the plurality of financial ratios are summed to provide the dealership score. Preferably, 200 points is added to the sum of the point weights to provide the dealership score. Dealership scores were calculated using financial statement data of a sample group of 2565 non-status dealerships and 123 status dealerships. Table 14 provides score ranges, dealerships falling within these score ranges, and percentages of dealerships falling within these score ranges.

TABLE 14

| Score Range | Non-Status | Status | % of Total Non-Status | % of Total Status |
|---|---|---|---|---|
| 310-319 | 2 | 0 | 0.1 | 0.0 |
| 300-309 | 3 | 0 | 0.1 | 0.0 |
| 290-299 | 19 | 0 | 0.7 | 0.0 |
| 280-289 | 20 | 0 | 0.8 | 0.0 |
| 270-279 | 64 | 0 | 2.5 | 0.0 |
| 260-269 | 79 | 0 | 3.1 | 0.0 |
| 250-259 | 115 | 1 | 4.5 | 0.8 |
| 240-249 | 168 | 0 | 6.5 | 0.0 |
| 230-239 | 193 | 4 | 7.5 | 3.3 |
| 220-229 | 234 | 2 | 9.1 | 1.6// |
| 210-219 | 264 | 3 | 10.3 | 2.4 |
| 200-209 | 231 | 5 | 9.0 | 4.1 |
| 190-199 | 215 | 5 | 8.4 | 4.1 |
| 180-189 | 206 | 5 | 8.0 | 4.1 |
| 170-179 | 192 | 10 | 7.5 | 8.1 |
| 160-169 | 149 | 7 | 5.8 | 5.7 |
| 150-159 | 103 | 6 | 4.0 | 4..9 |
| 140-149 | 97 | 7 | 3.8 | 5.7 |
| 130-139 | 80 | 13 | 3.1 | 10.6 |
| 120-129 | 56 | 7 | 2.2 | 5.7 |
| 110-119 | 29 | 10 | 1.1 | 8.1 |
| 100-109 | 21 | 13 | 0.8 | 10.6 |
| 90-99 | 10 | 11 | 0.4 | 8.9 |
| 80-89 | 11 | 7 | 0.4 | 5.7 |
| 70-79 | 1 | 3 | 0.0 | 2.4 |
| 60-69 | 2 | 3 | 0.1 | 2.4 |
| 50-59 | 1 | 1 | 0.0 | 0.8 |
| Total | 2565 | 123 | 100.0 | 100.0 |

Preferably, the dealership scores are broken into 10 tiers, as provided in Table 15. The dealership scores are segmented into 10 tiers from low risk of default to high risk of default. Preferably, risk management techniques and resources are applied to vehicle dealerships based on their risk tier.

TABLE 15

| Tier | Score Range | Non-Status | Status | Non-Status % | Status % | 1 Year Default Prob. |
|---|---|---|---|---|---|---|
| 1 | 240-314 | 470 | 1 | 18.32 | 0.81 | 0.1 |
| 2 | 220-239 | 427 | 6 | 16.65 | 4.88 | 0.6 |
| 3 | 200-219 | 495 | 8 | 19.30 | 6.50 | 0.7 |
| 4 | 180-199 | 421 | 10 | 16.41 | 8.13 | 1.0 |
| 5 | 160-179 | 341 | 17 | 13.29 | 13.82 | 2.1 |
| 6 | 140-159 | 200 | 13 | 7.80 | 10.57 | 2.7 |
| 7 | 120-139 | 136 | 20 | 5.30 | 16.26 | 5.9 |
| 8 | 100-119 | 50 | 23 | 1.95 | 18.70 | 16.4 |
| 9 | 80-99 | 21 | 18 | 0.82 | 14.63 | 26.7 |
| 10 | 50-79 | 4 | 7 | 0.16 | 5.69 | 42.7 |
| | | 2565 | 123 | 100.0 | 100.0 | 2.0 |

The one-year default probability is calculated by weighting status dealerships by 0.02/0.0458 and non-status dealerships by 0.98/0.954, where the weights represent the fraction of status or non-status dealers in the population to the fraction of status or non-status dealers in the sample. This calculation ensures that the proportion of status and non-status dealers in the sample represents their relative proportion in the population. The overall population probability of default of 2% is presumed.

Reference will now be made to a preferred method of implementing the developed default risk assessment method. FIG. 1 represents a block flow diagram illustrating a preferred methodology for implementing the present invention. As represented in block 12, the preferred methodology receives financial statement data from a vehicle dealership. The financial statement data used in the preferred method includes, but is not limited to, total current assets, total current liabilities, net cash, monthly total expense, used vehicle inventory, used vehicle notes payable, total fixed expense, total liabilities, notes payable for officers and owners, total gross total dealership, total variable sales expense, inventory, notes payable, current year sales, previous year sales, new vehicle notes payable, new vehicle inventory, current year current ratio, previous year current ratio, accounts payable, accounts accrued (including tax, payroll, bonus, and profit sharing), monthly total expense, earnings before interest and taxes, TBC, operating profit, total depreciation, change in inventory, change in receivable, change in accounts payable and accrued, and interest.

As represented in block 14, financial ratio(s) with a plurality of point weights are received. Preferably, eleven financial ratios can be utilized. To compute the values for the preferred eleven ratios, equations 1-11 are utilized. The plurality of point weights associated with each of the eleven preferred financial ratios are found in Tables 2-14.

As represented in block 16, dealership point weights are determined by computing the financial ratio values and correlating the value with one of the plurality of point weights.

As depicted in block 18, the dealership point weights for the preferred eleven financial ratios are summed to provide an overall score for the vehicle dealership. According to the preferred method of the present invention, 200 points is added to the sum of the point weights for the preferred eleven ratios. Generally, status dealerships have lower overall scores than non-status dealerships.

As depicted in block 20, the overall score is compared with a plurality of score ranges to obtain a default risk rating for the vehicle dealership. Preferably, the plurality of score ranges is comprised of ten risk tiers, as provided in Table 15. Preferably, risk management techniques and resources are applied to vehicle dealerships based on their risk tier. For example, dealers in the riskiest tiers may be more frequently audited.

In accord with a preferred embodiment, a system is disclosed to assess the risk of a vehicle dealership defaulting on a financial obligation. Preferably, a user can utilize a computer spreadsheet file that contains at least one financial factor with a plurality of point weights. Financial statement data received from a vehicle dealership can be input into the computer spreadsheet to determine a dealership point weight based on the financial factor(s) and point weights to obtain a default risk rating as described above.

While the best mode for carrying out the invention has been described in detail, those familiar with the art to which this invention relates will recognize various alternative designs and embodiments for practicing the invention as defined by the following claims.

What is claimed:

1. A computer-implemented method for assessing the risk of a vehicle dealership defaulting on a financial obligation, the method comprising:
   receiving by at least one computer vehicle dealership financial statement data;
   receiving by the at least one computer at least one financial ratio, a plurality of financial ratio value ranges for the at least one financial ratio, and a plurality of point weights functionally associated with the plurality of financial ratio value ranges, wherein the functional association of the plurality of point weights to the plurality of financial ratio value ranges is non-linear;
   determining by the at least one computer a financial ratio value for each financial ratio based on each financial ratio and the vehicle dealership financial statement data, wherein the plurality of financial ratio value ranges for the at least one financial ratio have a plurality of additional, associated values based on deciles of a sample vehicle dealership population having a number of non-status vehicle dealerships and a number of status vehicle dealerships, and wherein the number of non-status vehicle dealerships has met their contractual payment obligations and the number of status vehicle dealerships has defaulted on a contractual payment obligation; and
   determining by the at least one computer a vehicle dealership point weight for each financial ratio based on each financial ratio value and the related plurality of point weights and its non-linear functional association with the related financial ratio value ranges to obtain a default risk rating for the vehicle dealership.

2. The computer-implemented method of claim 1 wherein the at least one financial ratio is comprised of at least two financial ratios and the determining step includes summing the vehicle dealership point weights to provide an overall score for the vehicle dealership.

3. The computer-implemented method of claim 2, further comprising comparing the overall score with a plurality of score ranges segmented based on risk of default as indicated by the sample vehicle dealership population to obtain a default risk tier within ten risk tiers for the vehicle dealership, wherein a lower score range includes a greater probability of default than a higher score range.

4. The computer-implemented method of claim 3, further comprising determining a default probability percentage for the vehicle dealership based on the number of non-status vehicle dealerships and the number of status vehicle dealerships within the sample vehicle dealership population within the default risk tier for the vehicle dealership and a presumed overall population probability of default.

5. The computer-implemented method of claim 1, wherein the at least one financial ratio is comprised of at least two financial ratios.

6. The computer-implemented method of claim 5 wherein the at least one financial ratio includes current ratio and net cash per average monthly expense.

7. The computer-implemented method of claim 6 wherein the at least one financial ratio further includes used vehicle equity, break even analysis, and modified quick ratio.

8. The computer-implemented method of claim 7 wherein the at least one financial ratio further includes sales trend, percent SOT, and current ratio trends.

9. The computer-implemented method of claim 8 wherein the at least one financial ratio further includes accounts payable and accruals per average monthly expense, EBIT per TBC, and cash flow coverage.

10. A system for assessing the risk of a vehicle dealership defaulting on a financial obligation, the system comprising an at least one computer configured to:
    receive at least one financial ratio, a plurality of financial ratio value ranges for the at least one financial ratio, and a plurality of point weights functionally associated with the plurality of financial ratio value ranges and vehicle dealership financial statement data for determining a financial ratio value for the at least one financial ratio, wherein the functional association of the plurality of point weights to the plurality of financial ratio value ranges is non-linear, and wherein the plurality of financial ratio value ranges for the at least one financial ratio have a plurality of additional, associated values based on deciles of a sample vehicle dealership population having a number of non-status vehicle dealerships and a number of status vehicle dealerships, and wherein the number of non-status vehicle dealerships has met their contractual payment obligations and the number of status vehicle dealerships has defaulted on a contractual payment obligation;
    determine a financial ratio value for each financial ratio based on each financial ratio and the related vehicle dealership financial statement data; and
    determine a vehicle dealership point weight for each financial ratio based on each financial ratio value and the related plurality of point weights and its non-linear functional association with the related financial ratio value ranges to obtain a default risk rating for the vehicle dealership.

11. The system of claim 10, wherein the at least one financial ratio is comprised of at least two financial ratios and the at least one computer is additionally configured to sum the vehicle dealership point weights to provide an overall score for the vehicle dealership.

12. The computer-implemented system of claim 11, wherein the at least one computer is additionally configured to compare the overall score with a plurality of score ranges segmented based on risk of default as indicated by the sample vehicle dealership population to obtain a default risk tier within ten risk tiers for the vehicle dealership, wherein a lower score range has a greater probability of default than a higher score range.

13. The system of claim 12, wherein the at least one computer is additionally configured to determine a default probability percentage for the vehicle dealership based on the number of non-status vehicle dealerships and the number of status vehicle dealerships within the sample vehicle dealership population within the default risk tier for the vehicle dealership and a presumed overall population probability of default.

14. A computer-readable medium having computer-executable instructions which, when executed by a computer, performs the method comprising:

receiving at least one financial ratio, a plurality of financial ratio value ranges for the at least one financial ratio, and a plurality of point weights functionally associated with the plurality of financial ratio value ranges, and vehicle dealership financial statement data for determining a financial ratio value for the at least one financial ratio, wherein the functional association of the plurality of point weights to the plurality of financial ratio value ranges is non-linear, and wherein the plurality of financial ratio value ranges for the at least one financial ratio have a plurality of additional, associated values based on deciles of a sample vehicle dealership population including a number of non-status vehicle dealerships and a number of status vehicle dealerships, and wherein the number of non-status vehicle dealerships has met their contractual payment obligations and the number of status vehicle dealerships has defaulted on a contractual payment obligation;

determining a financial ratio value for each financial ratio based on each financial ratio and the related vehicle dealership financial statement data; and determining a vehicle dealership point weight for each financial ratio based on each financial ratio value and the related plurality of point weights and its non-linear functional association with the related financial ratio value ranges to obtain a default risk rating for the vehicle dealership.

15. The method of claim 14, wherein the at least one financial ratio is comprised of at least two financial ratios and the determining step includes summing the vehicle dealership point weights to provide an overall score for the vehicle dealership.

16. The computer-implemented method of claim 15, further comprising comparing the overall score with a plurality of score ranges segmented based on risk of default as indicated by the sample vehicle dealership population to obtain a default risk tier within ten risk tiers for the vehicle dealership, wherein a lower score range has a greater probability of default than a higher score range.

17. The method of claim 16, further comprising determining a default probability percentage for the vehicle dealership based on the number of non-status vehicle dealerships and the number of status vehicle dealerships within the sample vehicle dealership population within the default risk tier for the vehicle dealership and a presumed overall population probability of default.

* * * * *